US012722156B2

(12) United States Patent
Pollock et al.

(10) Patent No.: US 12,722,156 B2
(45) Date of Patent: Sep. 1, 2026

(54) CONTAINER AND CONTAINER ARRANGEMENT FOR LIQUID TO BE DISPENSED

(71) Applicant: TECAN GENOMICS, INC., Redwood City, CA (US)

(72) Inventors: Neil Pollock, Hertfordshire (GB); Giles Hugo William Sanders, Fowlmere (GB); Philip John Rawlins, Orwell (GB)

(73) Assignee: TECAN GENOMICS, INC., Redwood City, CA (US)

( * ) Notice: Subject to any disclaimer, the term of this patent is extended or adjusted under 35 U.S.C. 154(b) by 146 days.

(21) Appl. No.: 18/722,195

(22) PCT Filed: Dec. 29, 2021

(86) PCT No.: PCT/US2021/065436

§ 371 (c)(1),
(2) Date: Jun. 20, 2024

(87) PCT Pub. No.: WO2023/129145

PCT Pub. Date: Jul. 6, 2023

(65) Prior Publication Data

US 2025/0041867 A1 Feb. 6, 2025

(51) Int. Cl.
*B01L 3/00* (2006.01)

(52) U.S. Cl.
CPC ............... *B01L 3/523* (2013.01); *B01L 3/545* (2013.01); *B01L 2200/0689* (2013.01);
(Continued)

(58) Field of Classification Search
CPC .. B01L 3/425; B01L 3/545; B01L 2200/0689; B01L 2300/021;
(Continued)

(56) References Cited

U.S. PATENT DOCUMENTS

2007/0241552 A1* 10/2007 Watson ................ B65D 75/367 283/81
2016/0220994 A1 8/2016 Wright
(Continued)

OTHER PUBLICATIONS

International Search Report and Written Opinion for International Application No. PCT/US2021/065436 mailed Jul. 8, 2022.

*Primary Examiner* — Jeremy Carroll
(74) *Attorney, Agent, or Firm* — Notaro, Michalos & Zaccaria P.C.

(57) ABSTRACT

A container for a liquid to be dispensed has a bottom layer with a cavity defined by a closed perimeter wall with a connecting plate that adjoins the closed perimeter wall and extends in a single plane. A nozzle is provided in the closed perimeter wall in an area furthest away from the connecting plate. A top layer is sealingly attached to the connecting plate at least around the opening of the cavity. The bottom layer is made of a rigid material. The top layer is made of a flexible material. The material properties of the top layer are such that the top layer, when deformed, can at least partially lay laminar against the inside of the cavity without tearing.

16 Claims, 3 Drawing Sheets

(52) U.S. Cl.
CPC ... *B01L 2300/021* (2013.01); *B01L 2300/042* (2013.01); *B01L 2300/0851* (2013.01); *B01L 2300/123* (2013.01)

(58) Field of Classification Search
CPC ....... B01L 2300/042; B01L 2300/0851; B01L 2300/123
See application file for complete search history.

(56) References Cited

U.S. PATENT DOCUMENTS

| | | | | |
|---|---|---|---|---|
| 2018/0120338 | A1* | 5/2018 | Horii | G01N 35/02 |
| 2019/0120868 | A1 | 4/2019 | Amorese et al. | |
| 2020/0030795 | A1* | 1/2020 | Pais | B01L 3/527 |
| 2021/0237083 | A1* | 8/2021 | Amorese | G01N 35/1002 |

* cited by examiner

CONTAINER AND CONTAINER ARRANGEMENT FOR LIQUID TO BE DISPENSED

TECHNICAL FIELD OF THE INVENTION

The current invention relates to containers and container arrangements for liquid to be dispensed, in particular to laboratory containers and laboratory container arrangements for liquid to be dispensed into other laboratory containers in a single shot.

DESCRIPTION OF THE RELATED ART

US 2019/0120868 discloses a reservoir defined by a bowl-shaped rigid bottom barrier with a nozzle and by a dome-shaped deformable top barrier, which is configured to collapse in response to an applied force thereon.

US 2016/0220994 discloses a reservoir defined by a flat rigid bottom barrier with a nozzle and a dome-shaped deformable top barrier.

The production and the filling of such reservoirs is complex and laborious. Also, the storage of such reservoirs is unfavourable because the top barrier must be prevented from being pressed in.

SUMMARY OF THE INVENTION

One task of the present invention is to provide a container for liquids to be dispensed into other containers in a single shot, while avoiding the disadvantages of the previously mentioned related art.

This task is solved by a container with the features of claim 1. Further embodiments of the container, as well as embodiments of a container arrangement are defined by the features of further claims.

A container for liquids to be dispensed according to the invention comprises a bottom layer with a cavity being defined by a closed perimeter wall and with a connecting plate that adjoins the closed perimeter wall and that extends in a single plane. A nozzle being provided in the closed perimeter wall, in an area furthest away from the connecting plate. The container further comprises a top layer that is sealingly attached to the connecting plate at least around the opening of the cavity. The bottom layer being made of a rigid material and the top layer being made of a flexible material, whose material properties are as such that the top layer, when deformed can at least partially lay laminar against the inside if the cavity without tearing.

Such a container is easy to produce, easy to fill and easy to store. Additionally, the entire liquid content of such a container can be reliably dispensed in a single shot.

The sealing attachment from the top layer to the bottom layer can be done by gluing or by welding. The welding can be done by pressing together and heating the top layer and the bottom layer.

In one embodiment, the cavity is bowl-shaped and the closed perimeter wall, with respect to the connecting plate, is more inclined in a first area close to the connecting plate than in at least one second area further away from it. The inclination is defined as the angle between the plane of the connecting plate and the corresponding contour line of the closed perimeter wall in a cross section. The transition area between the connecting plate and the closed perimeter wall can be rounded, resulting in an area closest to the connecting plate that is less inclined.

The cavity may have a cross section that is polygonal or circular. A circular cavity can have an opening diameter of around 7 millimeters and the distance of two neighbouring cavities, i.e., their pitch can be around 9 millimeters. The 9 millimeter pitch corresponds to the pitch of a standard 96-well microplate. Other opening diameters and other pitches are possible. The volume of the cavity is as such that around 20 to 25 microliters of liquid can be loaded without the meniscus being high enough to touch the top layer. The total volume of the cavity can be around 35 microliters. The thickness of the bottom layer can be around 0.5 to 1 millimeters. The nozzle can have a diameter of around 100 to 300 micrometers.

For example, the nozzle can be conical and can have an inner diameter of around 270 micrometers and can have an exit diameter of around 100 micrometers.

In one embodiment, all cavities are sealed by a common top layer. Alternatively, there can be several top layers, each only sealing a part of the cavities. The top layers can be stripe-shaped and can cover only a straight line of cavities. The top layers may have a thickness of around 100 micrometers.

In one embodiment, the transition of the inclination of the first area of the closed perimeter wall to the at least one second area of the closed perimeter wall is designed to be continuous or step-like. For example, a continuous design comprises the shape of a spherical or ellipsoid segment and a step-like design comprises a multi cone design, wherein the cone of the first area is more inclined than the cone of the at least one second area.

In one embodiment, a closed circumferential collar is arranged around the nozzle on the outside of the closed perimeter wall and forming a protection for the nozzle outlet and a support surface for a tear-off film, as will be explained in the following. The collar may have an inside diameter of around 1.5 millimeters, an outside diameter of around 2.5 millimeters and a height of around 0.1 millimeters.

In one embodiment, the container further comprises a tear-off film which seals the nozzle, and which can be removed non-destructively. The tear-off film may have a thickness of around 80 micrometers.

In one embodiment, the tear-off film is sealingly attached to the closed circumferential collar. For example, to the end face thereof. The attachment can be realized by an individual adhesive layer or by glue applied on the tear-off film.

In one embodiment, the connecting plate comprising a first flap on one side with respect to the cavity. Since the flap is used for holding, its dimension needs to be as such that it can be gripped with two fingers. Additionally, the first flap can be used for positioning the container when used.

In one embodiment, the connecting plate comprising a second flap on a side opposite to the first flap with respect to the cavity. Also, the second flap can be used for positioning.

In one embodiment, at least one rib is provided that connects the closed perimeter wall to the connecting plate.

For example, such ribs can be arranged on two opposing sides of the cavity. The ribs increase the rigidity of the container.

In one embodiment, a label is arranged on the top surface of the connecting plate. For example, the label is a printed or engraved 1D or 2D barcode or matrix code. Other optically readable labels, such as colors or electronically readable labels, such as RFID tags can also be used. With electronically readable labels, the label need not be on the top surface, but can be enclosed in the connecting plate. The label can comprise information regarding the amount and composition of the liquid contained in the cavity.

In one embodiment, the bottom layer is made of a material from the group including metal, glass, silicon, plastic, or composite and wherein the top layer is made of plastic. For example, the bottom layer is made from a medical grade, PCR inhibitor-free PP, such as Basell Profax PD702. For example, the bottom layer can be backed by Aluminium.

The features of the above-mentioned embodiments of the container can be used in any combination, unless they contradict each other.

A container arrangement according to the invention for liquid to be dispensed, comprises several containers according to one of the preceding embodiments, wherein all containers are connected to each other by a common connecting plate. These containers can all be filled with the same liquid. Alternatively, the some or all containers can be filled with different liquids.

In one embodiment, the containers are arranged in an array comprising a single line or in an array comprising several lines parallel to each other.

In one embodiment, the closed perimeter walls of two adjoining containers are connected to each other by a common rib.

In one embodiment, all cavities are sealed by a common top layer. Alternatively, there can be several top layers, each only sealing a part of the cavities. The top layers can be strip-shaped and can cover only a straight line of cavities. The top layer may comprise perforations between two adjoining lines of cavities.

In one embodiment, all nozzles are sealed by a common tear-off film. Alternatively, there can be several tear-off films, each only sealing a part of the nozzles. The tear-off films can be stripe-shaped and can cover only a straight line of nozzles. The tear-off film may comprise perforations between two adjoining lines of nozzles.

The features of the before-mentioned embodiments of the container arrangement can be used in any combination, unless they contradict each other.

A method for producing a container or a container arrangement according to the invention comprises the steps of:

- Providing at least one container for liquid to be dispensed, comprising a bottom layer (1) with a cavity (10) being defined by a closed perimeter wall (11) and with a connecting plate (12) that adjoins the closed perimeter wall (11) and that extends in a single plane, wherein a nozzle (13) being provided in the closed perimeter wall (11), in an area furthest away from the connecting plate (12);
- Sealing some or all nozzles (13) with a common tear-off film (3), wherein the tear-off film (3) can be removed non-destructively;
- Filling the cavity (10) with a liquid, at least partially; and
- Sealing some or all cavities (10) with a common top layer (2) by attaching it to the connecting plate (12) at least around the opening of the cavities (10), wherein the top layer (2) cannot be removed without destroying it.

BRIEF DESCRIPTION OF THE DRAWINGS

Embodiments of the current invention are described in more detail in the following with reference to the figures. These are for illustrative purposes only and are not to be construed as limiting. It shows FIG. 1 a perspective top view of a container arrangement according to the invention.

DETAILED DESCRIPTION OF THE INVENTION

Figure 1:
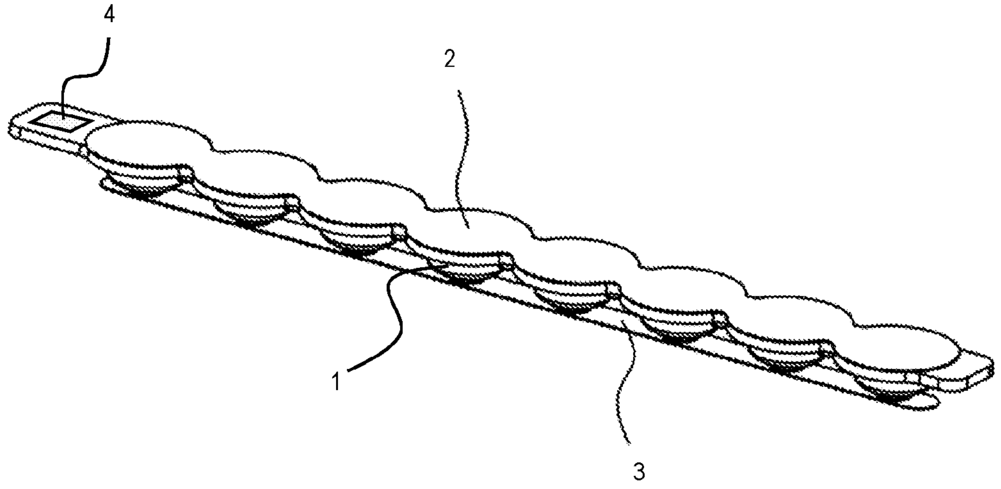

FIG. 1 shows a perspective top view of a container arrangement according to the invention. Depicted is a strip with eight cavities. The cavities or wells have a 7 millimeter opening diameter and a 9 millimeter pitch arrangement. The container arrangement comprising a rigid bottom layer 1 with a cavity and a flexible top layer 2 that is attached to the bottom layer 1 to seal the cavity. On the opposite side of the top layer 2, a tear-off film 3 is removably attached to the bottom layer 1, closing a nozzle, as will be explained in the following. A label 4 is arranged on one end side of the strip on the top surface of the top layer 2.

Figure 2:
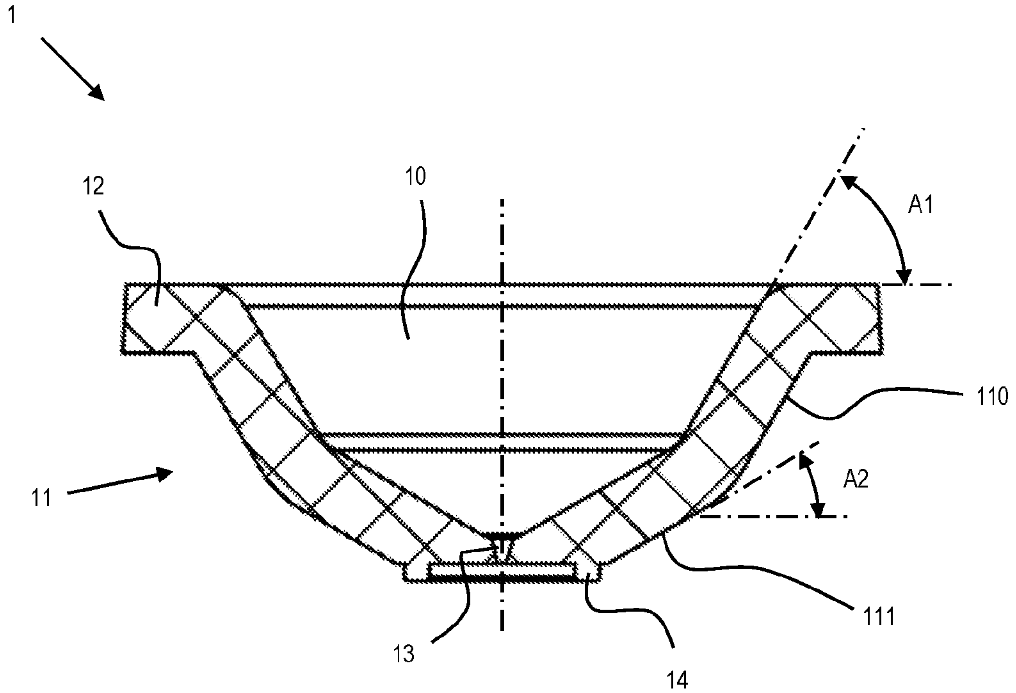
FIG. 2 a sectional view of one of the containers of FIG. 1.

FIG. 2 shows a sectional view of one of the containers of FIG. 1. The bottom layer 1 comprises a bowl-shaped cavity 10 that is defined by a closed perimeter wall 11. A connecting plate 12 that extends in a single plane adjoins the closed perimeter wall around the opening of cavity 10. The closed perimeter wall 11 comprises a first area 110 close to the connecting plate 12 and a second area 111 further away thereof. The first area 110 is inclined with respect to the plane of the connecting plate 12 by a first angle A1 and is more inclined with respect to the plane of the connecting plate 12 than the second area 111, which is inclined with respect to the plane of the connecting plate 12 by a second angle A2. The transition area between the connecting plate 12 and the closed perimeter wall 11 and between the first area 110 and the second area 111 of the closed perimeter wall 11 are rounded. The first area 110 of the closed perimeter wall 11 forming a cone segment and the second area 111 of the closed perimeter wall 11 forming a cone. A nozzle 13 is arranged at the tip of the cone, i.e., in the location of the closed perimeter wall 11 furthest away from the connecting plate 12. A closed circumferential collar 14 is arranged the nozzle 13 on the outside if the closed perimeter wall 11, i.e., at the bottom thereof. The end face of the collar 14 forming a surface being arranged in a single plane, parallel to the one of the connecting plate 12.

Figure 3:
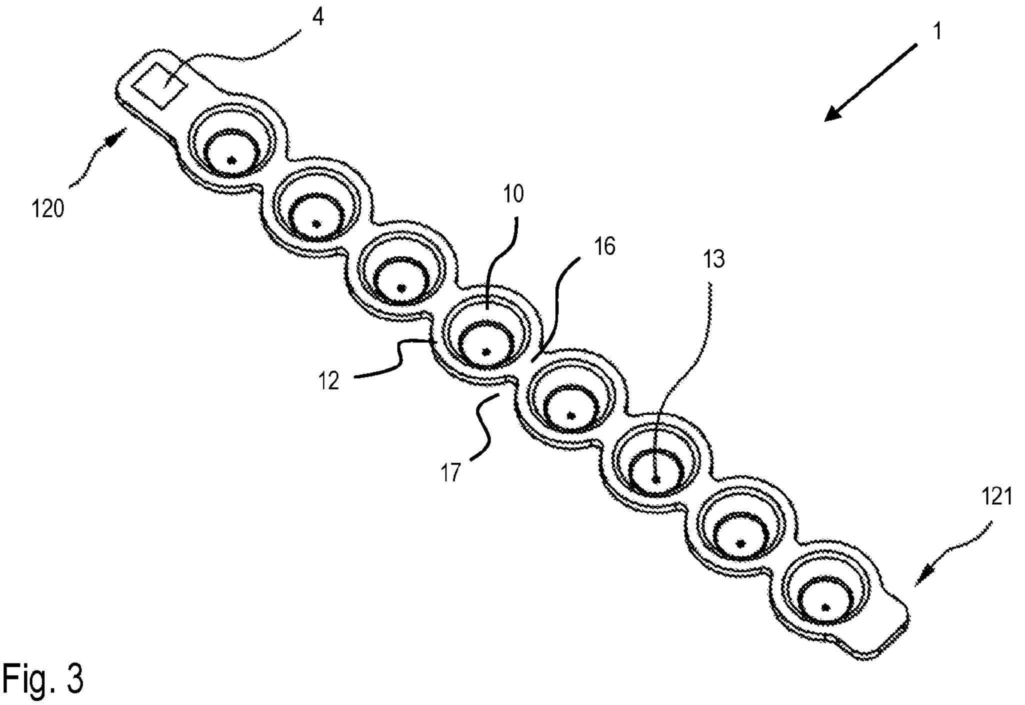
FIG. 3 perspective top view of the container arrangement of FIG. 1, without top layer.

FIG. 3 shows a perspective top view of the container arrangement of FIG. 1, without top layer. The connecting plate 12 comprising of ring sections that surround the openings of the cavities 10 and first webs 16 that connect two adjoining ring sections. Since the first webs 16 are narrower in width then the ring sections, first recesses 17 are formed adjacent to the first webs 16, between the ring sections of two neighbouring cavities 10. In the shown embodiment, the first webs 16 are narrower than the diameter of the openings of the cavities 10. The first webs 16 may comprise a perforation or keyway so that two neighbouring cavities 10 can be separated from each another with less effort. The ring sections and the first webs 16, and therefore also the cavities 10 are aligned on a single line and together form a single strip. On a first end of the strip, a first flap 120 is arranged. The first flap 120 being dimensioned as such that it can be gripped with two fingers. The side faces of the first flap 120 being parallel to each other und parallel to the longitudinal axis of the strip. Therefore, the first flap 120 can be used for the exact positioning of the strip when used. On a second end of the strip, opposite its first end, a second flap 121 is arranged. The side faces of the second flap 121 are congruent with the corresponding side faces of the first flap 120, allowing them also to be used for positioning. A label 4 is arranged on the top surface of the first flap 120. The label containing information on the content of the cavities, i.e., on the quantity and the composition of the contained liquid.

Figure 4:
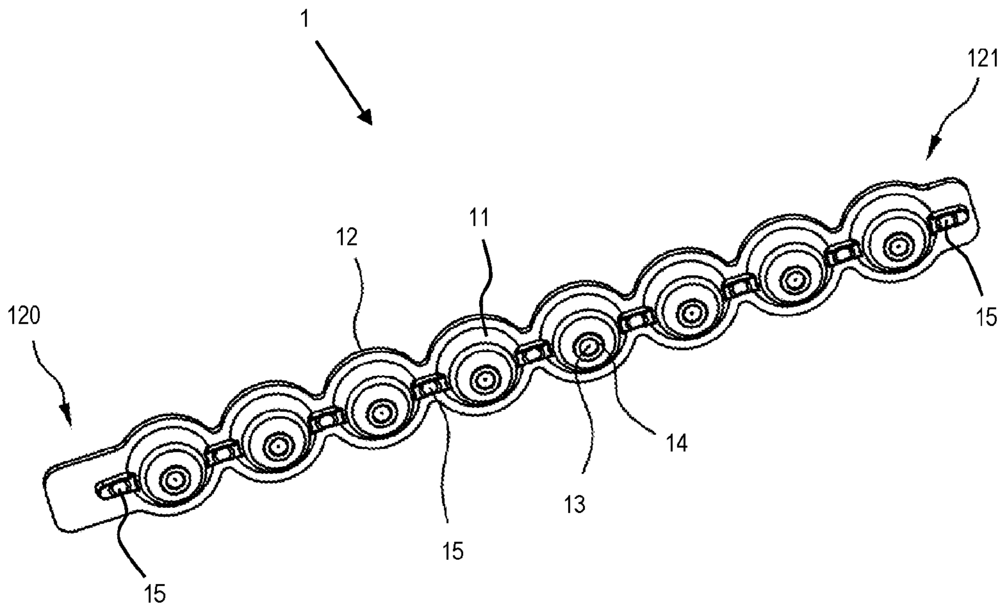
FIG. 4 a perspective bottom view of the container arrangement of FIG. 1 without tear-off film.

FIG. 4 shows a perspective bottom view of the container arrangement of FIG. 1 without tear-off film. On the bottom side of the connecting plate 12, ribs 15 are arranged that connect two adjoining closed perimeter walls 11 to the connecting plate 12 and to each other. Also, in the two end regions of the strip, i.e., at the first strip and at the second strip 121, a rib 15 is provided. The closed perimeter walls 11, the connecting plate 12 and the ribs 15 are being formed integrally in a single piece from a single material.

Figure 5:
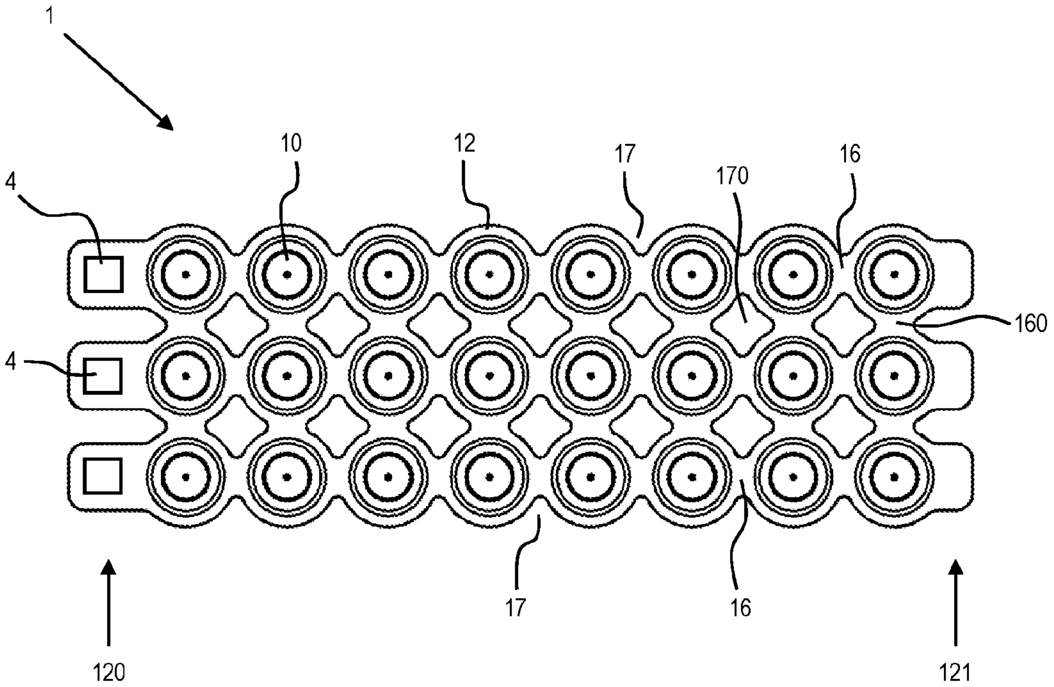
FIG. 5 a top view of a three by eight container arrangement.

FIG. 5 shows a top view of a three by eight container arrangement 1. In this embodiment, three stripes like those of FIGS. 3 and 4 are joined together, wherein the cavities 10 of neighbouring strips are connected by respective second webs 160. In the middle of four neighbouring cavities 10, second recesses 170 are formed. Two first webs 16 and two second webs 160 adjoin the second recesses 170. The second webs 160 may comprise a perforation or keyway so that two neighbouring strips can be separated from each another with less effort. Each strip can have its own label 4 or there can be a single label 4 for several or all the strips of the container arrangement 1.

REFERENCE SIGNS LIST

1 bottom layer 15 rib
10 cavity 16 first web
11 side wall 160 second web
110 first area 17 first recess
111 second area 170 second recess
12 connecting plate 2 top layer
120 first flap 3 tear-off film
121 second flap 4 label
13 nozzle
14 collar

The invention claimed is:

1. A container arrangement for a liquid to be dispensed, comprising several containers that are connected to each other by a common connecting plate, each of the containers comprising:
- a bottom layer with a cavity being defined by a closed perimeter wall and with the connecting plate that adjoins the closed perimeter wall and that extends in a single plane,
- a nozzle provided in the closed perimeter wall in an area furthest away from the connecting plate,
- a top layer that is sealingly attached to the connecting plate at least around the opening of the cavity,
- wherein the bottom layer is made of a rigid material and the top layer is made of a flexible material having material properties such that the top layer, when deformed can at least partially lay laminar against the inside of the cavity without tearing, and
- wherein the connecting plate comprises ring sections that surround the openings of the cavities of the several containers and first webs that connect two adjoining ring sections, wherein the cavities with the ring sections and the first webs are aligned on a single line and together form a single strip, and wherein the first webs are narrower in width than the ring sections, resulting in first recesses being formed adjacent to the first webs between the ring sections of two neighboring cavities.

2. The container arrangement according to claim 1, wherein each cavity is bowl-shaped and wherein the closed perimeter wall, with respect to the connecting plate, is more inclined in a first area close to the connecting plate than in at least one second area further away from the connecting plate.

3. The container arrangement according to claim 1, wherein a closed circumferential collar is arranged around the nozzle on the outside of the closed perimeter wall.

4. The container arrangement according to claim 1, further including a tear-off film which seals the nozzle, and which can be removed nondestructively.

5. The container arrangement according to claim 4, wherein the tear-off film is sealingly attached to the closed circumferential collar.

6. The container arrangement according to claim 1, wherein the connecting plate comprising a first flap on one side with respect to the cavity.

7. The container arrangement according to claim 6, wherein the connecting plate comprises a second flap on a side opposite to the first flap with respect to the cavity.

8. The container arrangement according to claim 1, wherein at least one rib is provided that connects the closed perimeter wall to the connecting plate.

9. The container arrangement according to claim 1, wherein a label is arranged on the top surface of the connecting plate.

10. The container arrangement according to claim 1, wherein the bottom layer is made of a material selected from the group consisting of metal, glass, silicon, plastic, and composite and wherein the top layer is made of plastic.

11. The container arrangement according to claim 1, wherein the several containers are arranged in an array comprising a single line or in an array comprising several lines parallel to each other.

12. The container arrangement according to claim 1, wherein the closed perimeter walls of two adjoining containers of the several containers are connected to each other by a common rib.

13. The container arrangement according to claim 1, where at least some of the several cavities are sealed by a common top layer and/or wherein some or all nozzles are sealed by a common tear-off film.

14. The container arrangement according to claim 1, wherein neighboring strips are connected to one another by second webs, resulting in second recesses being formed in the middle of four neighboring cavities.

15. The container arrangement according to claim 14, wherein the first webs comprise a perforation or a keyway and/or wherein the second webs comprise a perforation or a keyway.

16. A method for filling a container arrangement, comprising:
- providing a container arrangement for a liquid to be dispensed, the container arrangement comprising several containers that are connected to each other by a common connecting plate, each of the containers comprising a bottom layer with a cavity being defined by a closed perimeter wall and with the connecting plate that adjoins the closed perimeter wall and that extends in a single plane, a nozzle provided in the closed perimeter wall, in an area furthest away from the connecting plate,
- wherein the bottom layer is made of a rigid material and wherein the connecting plate comprises ring sections that surround the openings of the cavities of the several containers and first webs that connect two adjoining ring sections, wherein the cavities with the ring sections and the first webs are aligned on a single line and together form a single strip, and wherein the first webs are narrower in width than the ring sections, resulting in first recesses being formed adjacent to the first webs between the ring sections of two neighboring cavities;

sealing some or all nozzles of the several containers with a common tear-off film, in which the tear-off film can be removed non-destructively;

filling the cavity of at least one of the several containers with a liquid, at least partially; and sealing the cavity of at least one of the several containers with a common top layer by attaching the common top layer to the connecting plate at least around the opening of the cavity, wherein the top layer is made of a flexible material having material properties such that the top layer, when deformed can at least partially lay laminar against the inside of the cavity without tearing.

* * * * *